3,401,173
HETEROCYCLIC ACYLAMINOBENZIMIDAZOLES
Alfred W. Chow, Radnor, John R. E. Hoover, Glenside, and Robert John Stedman, Paoli, Pa., assignors to Smith Kline & French Laboratories, Philadelphia, Pa., a corporation of Pennsylvania
No Drawing. Filed Apr. 5, 1966, Ser. No. 540,218
9 Claims. (Cl. 260—309.2)

ABSTRACT OF THE DISCLOSURE 2-heterocyclic carboxamidobenzimidazoles, in which the heterocyclic group is 5-membered and monocyclic, are prepared by reaction of a 2-aminobenzimidazole with a heterocyclic carboxylic acid chloride. The products are anthelmintic agents.

---

This invention relates to new heterocyclic compounds having anthelmintic activity. In particular, the invention relates to 2-aminobenzimidazoles substituted at the 2-amino group with various 5-membered heterocyclic carbonyl groups.

The compounds of the invention are represented by the following structural formula:

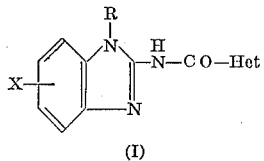

(I)

wherein

X is hydrogen, lower alkyl, lower alkoxy, chloro, bromo, trifluoromethyl, nitro, carboxy, hydroxy, carbamoyl, carbomethoxy, or dimethylamino;
R is hydrogen, lower alkyl, or benzyl; and
Het is a methylated or unmethylated monocyclic 5-membered heterocyclic ring bonded to the carbonyl carbon atom through one of its carbon atoms.

The heterocyclic nuclei embraced by Formula I are those in which the hetero atoms are nitrogen, oxygen, and sulfur, and have a minimum of 2 carbon atoms. They include 2-furyl, 3-furyl, 5-methyl-2-furyl, 2-tetrahydrofuryl, 3-tetrahydrofuryl, 2-thienyl, 3-thienyl, 2-tetrahydrothienyl, 1,1-dioxo-3-tetrahydrothienyl, 2-oxazolyl, 4-oxazolyl, 5-oxazolyl, 4-methyl-5-oxazolyl, 3-isoxazolyl, 4-isoxazolyl, 5-isoxazolyl, 3,5-dimethyl-4-isoxazolyl, 2-thiazolyl, 4-thiazolyl, 5-thiazolyl, 1,2,5-oxadiazol-3-yl, 1,2,5-thiadiazol-3-yl, 1,2,5-thiadiazol-4-yl, 1,2,3-thiadiazol-5-yl, 2-pyrrolyl, 3-pyrrolyl, 2-pyrrolidinyl, 2-imidazolyl, 4-imidazolyl, 3-pyrazolyl, and 4-pyrazolyl.

The terms "lower alkyl" and "lower alkoxy" when used in describing the compounds of this invention are intended to refer to those straight or branched chain alkyl and alkoxy groups having up to about 5 carbon atoms therein.

The compounds of the invention are generally prepared by condensing a 2-aminobenzimidazole, optionally substituted in the benzene ring, with the particular heterocyclic carboxylic acid chloride. The acid chlorides are either available commercially or are prepared by conventional methods from the corresponding carboxylic acids, such methods including treatment with thionyl chloride, oxalyl chloride, and phosphorus pentachloride. The condensation of the acid chloride with the 2-aminobenzimidazole is best carried out in the presence of a base in a solvent. One preferred method of preparation utilizes one compound both as the base and the solvent. Such basic solvents include pyridine and the alkylated pyridines. A second preferred method utilizes triethylamine as a base and a mixture of tetrahydrofuran and acetone as solvent. Other base-solvent systems will be apparent to those skilled in the art of organic chemistry. The best method known to the inventors for preparing the preferred compound of the invention consists of the dropwise addition of furan-2-carboxylic acid chloride to an equimolar amount of 2-aminobenzimidazole dissolved in pyridine. The solution is stirred for about 1–3 hours, then heated on the steam bath for a short period of time. Water is then added, or the solution is poured into ice water, to precipitate the crude product. Purification is achieved by dissolving the compound in aqueous alcoholic alkali and reprecipitating with an acid such as acetic acid, or by dissolving the compound in a solvent such as dimethylformamide and reprecipitating with water and/or acetonitrile. The resulting compound is 2-(2-furoylamino)-benzimidazole.

Compounds of Formula I in which X is amino are prepared by catalytic reduction of the corresponding nitro compound, preferably using a palladium-on-carbon catalyst.

Compounds in which X is a reactive group such as carboxy or hydroxy are best prepared by a procedure which is also applicable to the other compounds of the invention. Cyanamide is allowed to react with a selected heterocyclic acid chloride in pyridine, triethylamine, or other base-containing solvent, and this compound allowed to react with an appropriately substituted o-phenylenediamine, among which are 4-hydroxy or 4-carboxy-o-phenylenediamine. Upon workup, the correspondingly ring-substituted products are obtained.

Compounds in which X is hydrogen, lower alkyl, lower alkoxy, chloro, bromo, trifluoromethyl, nitro, carbamoyl, carbomethoxy, or dimethylamino are prepared by either preparative route, i.e. by starting with the correspondingly substituted o-phenylenediamine and condensing with the product of the reaction of cyanamide and an acid chloride, or by first preparing the ring-substituted 2-aminobenzimidazole by known methods and treating this with the acid chloride.

Compounds in which R is lower alkyl or benzyl are prepared by starting with the appropriately substituted 2-aminobenzimidazole, and condensing it with the heterocyclic acid chloride.

Also part of the invention are the acid addition salts which may be prepared in conventional manner from the basic compounds of Formula I. Such salts are prepared by addition of the acid either as such or in the form of a solution to an alcoholic, acetone, or acetonitrile solution of the base. Preferred salts are the hydrochloride, hydrobromide, sulfate, phosphate, acetate, citrate, and hexamate.

The compounds of the invention are anthelmintic agents, and have been found to have high activity against worms in mice and sheep at dose levels of 10–250 mg./kg. Among the worms against which the compounds are effective in mice are Syphacia obvelata and Nematospiroides dubius. The preferred compound, 2-(2-furoylamino)-benzimidazole, causes an 80–100% reduction in the number of worms present in mice infected with Syphacia obvelata when administered orally at a dosage level of 10–250 mg./kg. In the same test, 2-(2-thenoylamino)-benzimidazole caused an 84–89% reduction at a dose level of 250 mg./kg. The furoylamino compound, when administered orally to infected sheep at a dose level of 12.5 mg./kg., suspended in 80 ml. of water, eliminated 70.9% of the gastrointestinal worm burden. The compound was especially effective against Chabertia and Oesophagostomum spp. and showed good effectiveness against Trichuris ovis, Haeomonchus contortus, Ostertagia spp., and Trichostrongylus spp.

The compounds are generally administered orally, as a sheep drench or a bolus for cattle. Typical drench formulations may include, in addition to the active anthelmintic compound, terra alba, tragacanth, sodium lauryl sulfate, methyl cellulose, polyethylene glycol, silicone antifoam, and water. A cattle bolus may include calcium phosphate, maize starch, talcum, gum arabic, and magnesium stearate.

The following examples are intended to illustrate the preparation of the compounds of the invention, but are not to be construed as limiting the scope thereof.

Example 1.—2-(2-furoylamino)benzimidazole 2-aminobenzimidazole (10.0 g., 0.075 mole) is dissolved in 60 ml. of dry pyridine and the solution cooled in ice. To this stirred and cooled solution is added dropwise 9.75 g. (0.075 mole) of furan-2-carboxylic acid chloride over a 25 minute period. The mixture is stirred with cooling for 15 minutes, then on the steam bath for about an hour, and then 200 ml. of water is added. After the mixture is cooled, the resulting solid is filtered off and dried. The crude product is placed in 400 ml. of 1:1 water-ethanol and sufficient 10% sodium hydroxide added to achieve solution. The solution is filtered through Super-Cel and the filtrate neutralized to pH 6.0. The resulting solid is filtered off, washed with 1:1 water-ethanol, and dried. The compound is recrystallized by dissolving in a minimum of dry dimethylformamide and adding dry acetonitrile to the filtered warm solution until turbidity is reached. Cooling produces crystallization. A second recrystallization, followed by extraction with hot water and drying, gives the pure title product, M.P. 318–320° dec.

Calc'd for $C_{12}H_9N_3O_2$: C, 63.43; H, 3.99; N, 18.49%. Found: C, 63.57; H, 3.97; N, 18.51%.

To a methanol suspension of the product is added ethereal hydrogen chloride until the solution is red to litmus. The solution is cooled and scratched to give crystals of the product hydrochloride, which are collected and purified by recrystallization.

Example 2.—2-(2-thenoylamino)benzimidazole

Thiophene-2-carboxylic acid (50 g., 0.39 mole) and thionyl chloride (130 ml.) are warmed with stirring on a steam bath for about one hour. The excess thionyl chloride is then removed by distillation at atmospheric pressure. The acid chloride is distilled in vacuo at 82–84°/ca. 20 mm.

The acid chloride (25 g., 0.17 mole) is added dropwise over a 15 minute period to a solution of 22.8 g. (0.17 mole) of 2-aminobenzimidazole in 140 ml. of dry pyridine. The mixture is stirred for an additional 15 minutes and then maintained at 65–75° for a half hour. The solution is poured into a 4-fold excess of ice water and the solid collected and washed with water. The solid is suspended in 400 ml. of 50% ethanol, and 10% sodium hydroxide is added until all the solid has dissolved. After the solution is filtered, acetic acid is added to pH 7.5, and the resulting solid collected. The solid is dissolved in dimethylformamide at steam bath temperature, the solution is filtered, and water is added until the cloud point is reached. After cooling, the precipitated material is collected and then boiled in water to remove any residual dimethylformamide. The insoluble title product is filtered off. The compound melts at 308–309°.

Example 3.—2-(2-pyrrolecarboxamido)benzimidazole

To 8.2 g. (0.4394 mole) of finely divided phosphorus pentachloride suspended in 30 ml. of chloroform (dried over $P_2O_5$) and cooled in an ice bath is added in small portions over one half hour 4 g. (0.036 mole) of 2-pyrrolecarboxylic acid with stirring. During the course of the addition, the solution becomes thick and later is fluid. The chloroform is removed at room temperature under vacuum. To the resulting black residue is added 40 ml. each of ether and dry petroleum ether (30–60°), in that order, and the solution then filtered. The solvent is removed under vacuum at a temperature lower than 20°. The ether-petroleum ether addition, filtration, and evaporation procedure is then repeated, except that about one-fourth of the solvent is left. Upon cooling, solid is formed and collected, and then washed with cold petroleum ether. Evaporation of the filtrate gives more of the material, which is the acid chloride.

The acid chloride (0.95 g., 7.3 mmoles) is dissolved in 10 ml. of dry tetrahydrofuran and added dropwise to a solution of 0.98 g. (7.3 mmoles) of 2-aminobenzimidazole in 30 ml. of 5:1 acetone-tetrahydrofuran and 2 ml. (1.48 g., 14.6 mmoles) of triethylamine. The mixture is stirred at room temperature for 1 hour, the resulting solid removed, and ca. 150 ml. of water is added to the filtrate. Freezing the filtrate gives a brown solid which is collected on thawing and suspended in ca. 10 ml. of 50% ethanol. Sodium hydroxide (10%) is added until the solution is strongly basic. The insoluble material is then collected and the filtrate acidified to ca. pH 7 with 3 N HCl. The resultant precipitate is filtered off and washed with 50% ethanol. The compound is dissolved in dimethylformamide at steam bath temperature, the solution filtered, and water added until a precipitate forms. The mixture is cooled and the precipitate collected and dried to give the title product, M.P. 316–317° dec.

Example 4

When the following 2-aminobenzimidazoles are condensed with the following listed acid chlorides according to the procedures of Examples 1–3, the corresponding listed products are obtained.

| Benzimidazole | Acid chloride |
| --- | --- |
| 2-amino-1-benzyl-5-methyl-benzimidazole. | Furan-3-carboxylic acid chloride. |
| 2-amino-1-benzylbenzimidazole. | Tetrahydrofuran-2-carboxylic acid chloride. |
| 2-amino-1-ethylbenzimidazole. | 5-methylfuran-3-carboxylic acid chloride. |
| 2-amino-1-methyl-5-methoxybenzimidazole. | Furan-2-carboxylic acid chloride. |
| 2-amino-1-methylbenzimidazole. | Thiazole-4-carboxylic acid chloride. |
| 2-amino-5(6)-methylbenzimidazole. | Furan-2-carboxylic acid chloride. |
| 2-amino-5(6)-chlorobenzimidazole. | Thiophene-2-carboxylic acid chloride. |
| 2-amino-7-methoxy-1-methyl-benzimidazole. | Oxazole-2-carboxylic acid chloride. |
| 2-amino-1-methyl-5-nitrobenzimidazole. | Isoxazole-3-carboxylic acid chloride. |
| 2-amino-1-methyl-6-nitrobenzimidazole. | Pyrazole-4-carboxylic acid chloride. |
| 2-amino-5(6)-nitrobenzimidazole. | Furan-2-carboxylic acid chloride. |
| 2-amino-5-ethoxy-1-ethylbenzimidazole. | Thiophene-2-carboxylic acid chloride. |
| 2-amino-4(7)-trifluoromethylbenzimidazole. | Thiazole-5-carboxylic acid chloride. |
| 2-amino-5(6)-trifluoromethylbenzimidazole. | Furan-2-carboxylic acid chloride. |
| 2-amino-4(7)-chlorobenzimidazole. | Tetrahydrofuran-2-carboxylic acid chloride. |
| 2-aminobenzimidazole. | Do. |
| Do. | 5-methylfuran-2-carboxylic acid. |
| Do. | 4-methyloxazole-5-carboxylic acid. |
| 2-amino-5(6)methylbenzimidazole. | 3,5-dimethylisoxazole-4-carboxylic acid. |

PRODUCT 1-benzyl-2-(3-furoylamino)-5-methylbenzimidazole
1-benzyl-2-(2-tetrahydrofuroylamino)benzimidazole
2-(5-methyl-2-furoylamino)-1-ethylbenzimidazole
2-(2-furoylamino)-1-methyl-5-methoxybenzimidazole
1-methyl-2-(4-thiazolecarboxamido)benzimidazole
2-(2-furoylamino)-5(6)-methylbenzimidazole
5(6)-chloro-2-(2-thenoylamino)benzimidazole
7-methoxy-1-methyl-2-(2-oxazolecarboxamido)benzimidazole
2-(3-isoxazolecarboxamido)-1-methyl-5-nitrobenzimidazole
1-methyl-6-nitro-2-(4-pyrazolecarboxamido)benzimidazole
2-(2-furoylamino)-5(6)-nitrobenzimidazole
5-ethoxy-1-ethyl-2-(2-thenoylamino)benzimidazole
2-(5-thiazolecarboxamido)-4(7)-trifluoromethylbenzimidazole
2-(2-furoylamino)-5(6)-trifluoromethylbenzimidazole
4(7)-chloro-2-(2-tetrahydrofuroylamino)benzimidazole 2-(2-tetrahydrofuroylamino)benzimidazole
2-(5-methyl-2-furoylamino)benzimidazole
2-(4-methyl-5-oxazolecarboxamido)benzimidazole
2-(3,5-dimethyl-4-isoxazolecarboxamido)-5(6)methyl-benzimidazole Example 5.—5(6)-carboxy-2-(2-furoylamino)benzimidazole Cyanamide (3.44 g.) is dissolved in 70 ml. of pyridine and the mixture is cooled to 0–4° C.; while stirring, 10.7 g. of furan-2-carboxylic acid chloride is added in portions. The reaction mixture is maintained at 0–4° C. for 15 minutes, and is then allowed to stand for a short period at room temperature.

4-carboxy-o-phenylenediamine (12.5 g.) is added and the resulting mixture is kept at room temperature for a few hours, and then heated on a steam bath for about 2.5 hours.

The pyridine is evaporated in vacuo, aqueous alcohol is added, and the mixture is carefully acidified with dilute hydrochloric acid to precipitate the crude product.

The product is then purified by crystallization.

Example 6.—2-(2-furoylamino)-5(6)-aminobenzimidazole

2 - (2-furoylamino)-5(6)-nitrobenzimidazole, dissolved in formic acid, is hydrogenated over 5% palladium on charcoal until sufficient hydrogen is absorbed to reduce the nitro an amino group. The solvent is removed in vacuo, the residue diluted with water, and the product collected after neutralization.

We claim:
1. A compound of the formula

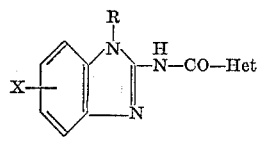

wherein:
X is hydrogen, lower alkyl, lower alkoxy, chloro, bromo, trifluoromethyl, nitro, carboxy, hydroxy, carbamoyl, carbomethoxy, or dimethylamino;
R is hydrogen, lower alkyl, or benzyl; and
Het is an unsubstituted or methylated aromatic monocyclic 5-membered heterocyclic ring, having a minimum of 2 carbon atoms, bonded to the carbonyl carbon atom through one of its carbon atoms; tetrahydrofuryl; tetrahydro thienyl; 1,1-dioxotetrahydrothienyl; or pyrrolidinyl;
or a pharmaceutically acceptable acid addition salt thereof.

2. A compound as claimed in claim 1, where Het is

3. A compound as claimed in claim 1, where Het is

4. A compound as claimed in claim 1, where R is hydrogen.

5. A compound as claimed in claim 1, in which X and R are hydrogen and Het is 2-furyl, being the compound 2-(2-furoylamino)benzimidazole.

6. A compound as claimed in claim 1, in which X and R are hydrogen and Het is 2-thienyl, being the compound 2-(2-thenoylamino)benzimidazole.

7. A compound as claimed in claim 1, in which X and R are hydrogen and Het is 2-tetrahydrofuryl, being the compound 2-(2-tetrahydrofuroylamino)benzimidazole.

8. A compound as claimed in claim 1, in which X and R are hydrogen and Het is 2-pyrrolyl, being the compound 2-(2-pyrrolecarboxamido)benzimidazole.

9. A compound as claimed in claim 1, in which X and R are hydrogen and Het is 5-methyl-2-furyl, being the compound 2-(5-methyl-2-furoylamino)benzimidazole.

References Cited

Biddle et al.: Chem. Abst. vol. 54, columns 22580–1 (1960).

Takahashi et al.: Chem. Abst. vol. 60, Column 5304 (1964).

NORMA S. MILESTONE, *Primary Examiner.*

NATALIE TROUSOF, *Assistant Examiner.*